United States Patent [19]

Linde et al.

[11] 4,032,277
[45] June 28, 1977

[54] INJECTION MOLDING MACHINE WITH HYDRAULICALLY OPERATED CLOSURE DEVICE

[75] Inventors: Joachim Linde, Leiselheim; Wolfgang Späth, Lahr, both of Germany

[73] Assignee: Klockner-Werke AG, Duisburg, Germany

[22] Filed: Nov. 5, 1975

[21] Appl. No.: 629,080

[30] Foreign Application Priority Data

Nov. 13, 1974 Germany .......................... 2453697

[52] U.S. Cl. .................... 425/591; 425/451.2; 425/451.7; 425/DIG. 223; 425/595
[51] Int. Cl.² ............................................ B29F 1/06
[58] Field of Search ......... 425/242 R, 451.2, 451.7, 425/DIG. 223

[56] References Cited

UNITED STATES PATENTS

| | | | |
|---|---|---|---|
| 2,862,238 | 12/1958 | Cuzzi | 425/451.2 |
| 3,245,122 | 4/1966 | Mauder | 425/DIG. 223 |
| 3,327,353 | 6/1967 | Eggenberger | 425/451.7 X |
| 3,543,346 | 12/1970 | Breher | 425/242 R |

FOREIGN PATENTS OR APPLICATIONS 43,885 11/1966 Germany ....................... 425/242 R

*Primary Examiner*—Robert L. Spicer, Jr.
*Attorney, Agent, or Firm*—Michael J. Striker

[57] ABSTRACT

Two halves of a split mold of an injection molding machine are respectively mounted on a stationary plate and a movable plate guided on guide rods projecting from the stationary plate for movement toward and away from the latter. A guide plate, likewise guided on said guide rods, is connected to the movable plate for movement therewith, and a moving arrangement is connected to the guide plate for moving the same and the movable plate connected thereto toward and away from the stationary plate to thus move the mold halves between an open and a closed position. The guide plate includes a clamping arrangement for clamping the guide plate in fixed position on the guide rods and a hydraulically operated arrangement for holding the mold halves in closed position against the force of molding material injected under pressure into complementary cavities in the mold halves.

8 Claims, 3 Drawing Figures

INJECTION MOLDING MACHINE WITH HYDRAULICALLY OPERATED CLOSURE DEVICE

BACKGROUND OF THE INVENTION

The present invention relates to an injection molding machine which includes a movable plate for one half of a split mold which, together with a guide plate connected thereto, is movable on guide rods toward and away from the other mold half mounted on a stationary plate. The guide plate includes a clamping cone movable in axial direction of the guide rods relative thereto and cooperating with a plurality of clamping jaws movable in radial direction during movement of the cone in axial direction into clamping engagement with portions of the guide rods.

Closure devices of this type are already known in the art and for instance disclosed in DT-PS No. 1,529,902. This known construction includes a clamping cone movable in axial direction and pressing during such movement clamping jaws cooperating therewith in radial direction against portions of stationary guide rods for the movable plate. To move the clamping cone in axial direction, this known arrangement includes a wedge-shaped key movable in a direction normal to the moving direction of the movable plate and hydraulically operated means for moving the wedge-shaped key in this normal direction. In order to reduce wear on the cooperating faces of the clamping cone and the wedge-shaped key, rollers, respectively balls, are arranged between the opposite cooperating faces. This known arrangement is rather complicated, requires considerable space, and has the additional disadvantage that it may lead to an undesirable tilting of the movable guide plate.

When, after the two mold halves are moved to the closed position thereto, molding material is injected under considerable pressure into the complementary cavities of the two mold halves, the pressure at which the molding material is injected tends to move the two mold halves away from each other. Therefore, a corresponding counteracting force has to be applied to the movable plate on which one of the mold halves is mounted to prevent such an undesired opening of the split mold during the molding operation. In principle, such a counteracting force could be provided by pressing the clamping jaws against the rods; however, this would require such a large pressure on the clamping jaws, which may subsequently lead to difficulties when attempting to loosen the clamping jaws so as to be able to move the mold halves to an open position at the end of the molding operation.

SUMMARY OF THE INVENTION

It is an object of the present invention to provide a closure device for an injection molding machine which avoids the above-mentioned disadvantages of such closure devices known in the art.

It is a further object of the present invention to provide a closure device in a molding machine of the aforementioned kind in which the force counteracting the force of the molding material injected under pressure into the mold cavity of the mold is independent from the force exerted by the clamping jaws on the guide rods.

It is an additional object of the present invention to provide such a closure device which is adapted for split molds of different thickness without requiring additional elements for this purpose.

With these and other objects in view, which will become apparent as the description proceeds, the injection molding machine according to the present invention comprises a stationary plate, a plurality of guide rods fixed at one end to the stationary plate and projecting substantially normal thereto, a movable plate mounted on the guide rods for movement toward and away from the stationary plate, a split mold having two complementary mold halves, one of which is mounted on the stationary plate and the other on the movable plate for movement therewith between an open and a closed position, guide plate means movably mounted on the guide rods and connected to the movable plate for movement therewith, moving means connected to the guide plate means and the movable plate connected thereto for moving said movable plate toward and away from the stationary plate to thereby move said mold halves between the open and the closed position, means for injecting molding material under pressure into the split mold, when the mold halves are in said closed position, means in the guide plate means for clamping the latter in fixed position on the guide rods, after the movable plate has been moved by said moving means, to bring the mold halves to the closed position, and hydraulically operated means incorporated in the guide plate and operable independently of the clamping means for providing a force maintaining the mold halves in the closed position against the force of the molding material injected under pressure thereinto.

The clamping means preferably comprise a clamping cone mounted in the guide plate means movable in axial direction of the rods and a plurality of clamping jaws engaging the peripheral surface of the cone and being moved during axial movement of the cone in radially outward direction into clamping engagement with the rods.

The clamping means may further include a guide frame having portions engaging outer peripheral portions of the rods, and the clamping jaws are arranged within the guide frame to respectively engage, during movement of the cone in the aforementioned axial direction, inner peripheral portions of the rod opposite to those engaged by the guide frame.

The guide plate means further preferably comprises a piston having a piston rod fixed to the movable plate, a membrane plate between the piston and the large diameter end face of the cone, a pair of membranes respectively sandwiched between opposite faces of the membrane plate, the large diameter end faces of the cone and the piston and forming with opposite end faces of the membrane plate a pair of pressure spaces, and means for feeding pressure fluid into the pressure spaces. This will provide for a very compact construction in which the force for maintaining the split mold in closed position during the molding operation will be independent from the force for clamping the guide plate on the rods.

The moving means connected to the guide plate means for moving the latter, and the movable plate connected thereto, toward and away from the stationary plate preferably comprises cylinder and piston means connecting the guide plate means with another stationary plate, forming together with the first mentioned stationary plate a stationary frame.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
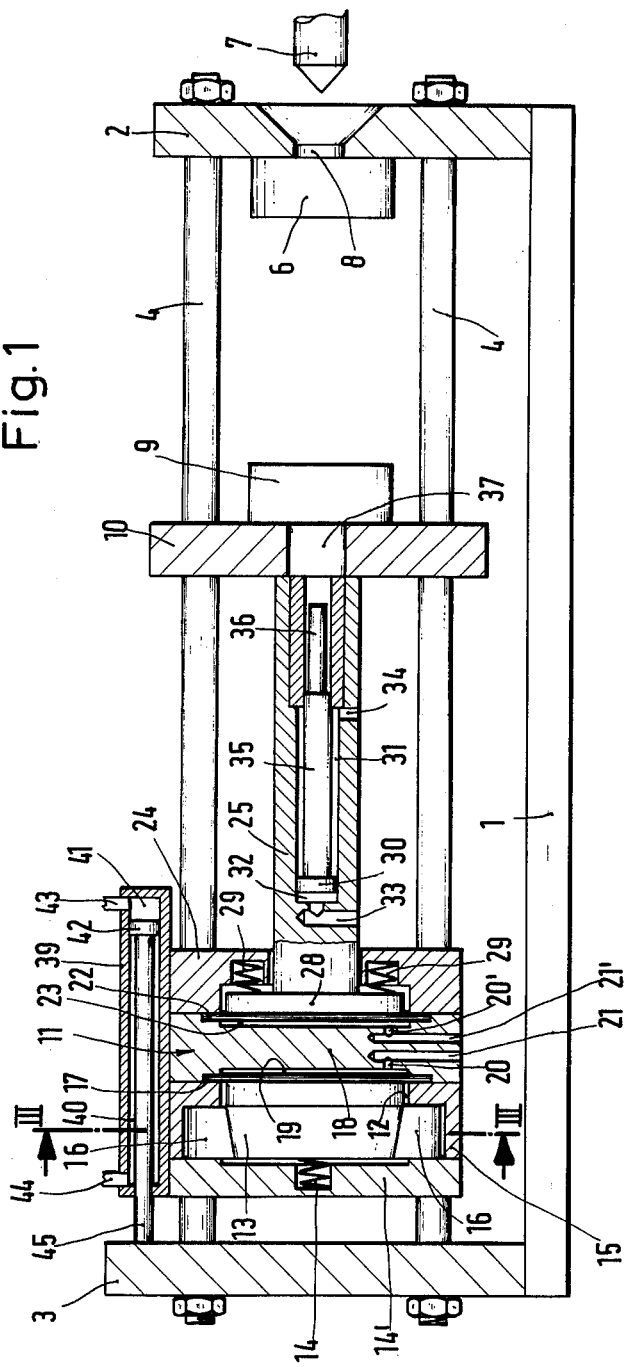
FIG. 1 is a longitudinal cross-section through the injection molding machine according to the present invention.
Figure 2:
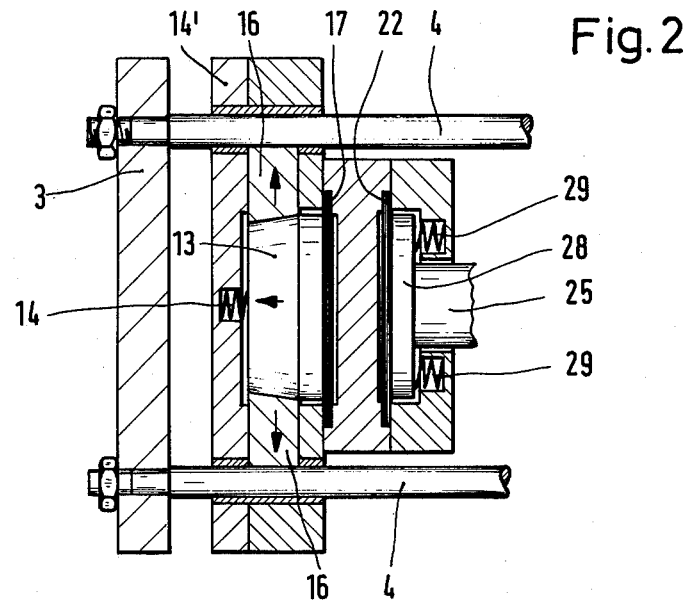
FIG. 2 is a cross-section taken along the line II—II of FIG. 3.

Referring now to the drawing, and more specifically to FIGS. 1 and 2, it will be seen that the injection molding machine according to the present invention comprises a pair of stationary plates 2 and 3 projecting parallel and spaced from each other upwardly from a base plate 1, and four guide rods 4, of which only the rear ones are visible in FIG. 1, which extend parallel and spaced from each other substantially normal to and between the stationary plates 2 and 3 and are fixedly connected to the latter by nuts or the like screwed onto opposite ends of the guide rods which project through corresponding openings in the stationary plates, as for instance shown in FIG. 2 for the plate 3. A movable plate 10 is guided on the guide rods 4 for movement toward and away from the stationary plate 2. The movable plate 10 carries one half 9 of a split mold and the other half 6 of the split mold is mounted on the stationary plate 2 axially aligned with the mold 9 on the movable plate 10. It is to be understood that each of the molding halves is formed with a complementary cavity portion not shown in the drawing, into which, when the mold halves 6 and 9 are moved to the closed position, as will be explained later on, molding material is injected under pressure in plasticized condition from injection means 7 of known construction and only partially illustrated in FIG. 1, through a corresponding opening 8 in the stationary plate and through a corresponding non-illustrated sprue passage formed in the mold half 6. Guide plate means generally referred to by the reference numeral 11 is movably guided on the guide rods and connected to the movable plate 10 by means to be described later on, for movement therewith. Moving means interconnects the guide plate means 11 with the stationary plate 3 for moving the guide plate means 11 and the movable plate 10 connected thereto, with the mold half 9 carried by the movable plate, toward and away from the mold half 6 carried by the stationary plate 2 so as to move the two mold halves 6 and 9 between open and closed positions. This moving means preferably comprises a cylinder 39 extending in longitudinal direction of the rod 4 and fixed to the guide plate means 11, a piston 42 movable in the cylinder and dividing the latter into two pressure spaces 40 and 41 located to opposite sides of the piston 42, and a piston rod 45 connected at opposite ends to the piston 42 and the stationary plate 3.

Passage means 43 and 44 communicates with the interior of the cylinder 39 in the region of opposite ends thereof and this passage means is connected at portions thereof not shown in the drawing, to a source of pressure fluid, likewise not illustrated, for feeding pressure fluid into and discharging it out of the aforementioned spaces 40 and 41 so as to move the cylinder 39 and the guide plate means 11 together with the movable plate connected to the guide plate means 11 toward and away from the stationary plate 2, to thereby move the mold halves 6 and 9 between open and closed positions.

Figure 3:
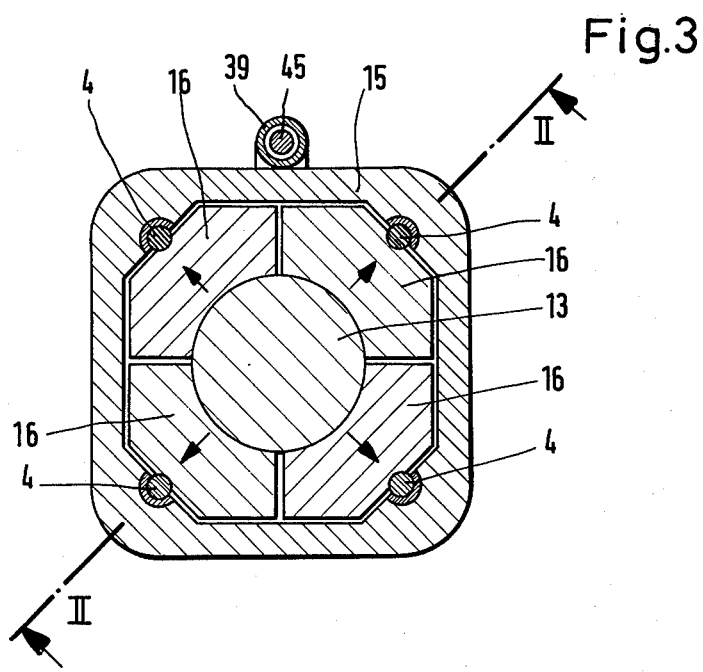
FIG. 3 is a cross-section taken along the line III—III of FIG. 1.

The guide plate means 11 comprises a guide frame 15 extending about the rods 4 and engaging, as best shown in FIG. 3, outer peripheral portions of the guide rods. A clamping cone 13 extends with its large diameter end portion through a circular opening or bore 12 of the guide frame, whereas the smaller diameter end of the clamping cone 13 faces an end plate 14' connected by screws or the like, not shown in the drawing, to the guide frame 14 and being provided in the center thereof with a blind bore in which a compression spring 14 is located. The compression spring 14 engages the small diameter end face of the cone 13 to bias the latter towards the right, as viewed in FIG. 1. The frusto-conical surface of the clamping cone 13 is engaged by four clamping jaws 16, as best shown in FIG. 3. The surfaces of the clamping jaws engaging the cone correspond to the frustoconical surface of the latter. The clamping jaws 16 are guided between the frame 15 and the end plate 14' for movement in radial direction and are pressed with considerable force against inner surface portions of the rods 4, which are respectively opposite the outer peripheral surface portions thereof which are in engagement with the guide frame 15, when the cone 13 is moved towards the end plate 14'. A membrane 17 extending transversely over the bore 12 engages the large diameter end face of the clamping cone 13 and the outer periphery of the membrane 17 is clamped between the right end face of the guide frame 15, as viewed in FIG. 1, and a membrane plate 18 abutting against the right end face of the frame 15 and being connected thereto by screws or the like, not shown in the drawing. The membrane 17 forms with the membrane plate 18 a pressure space 19 into which pressure fluid from a source of pressure fluid, not shown in the drawing, may be fed through the bores 20 and 21 provided in the membrane plate 18.

By feeding the pressure fluid into the pressure space 19, the clamping cone 13 is moved toward the stationary plate 3, which will move the clamping jaws 16 in radially outward direction, as indicated by the arrows in FIG. 3, so that the guide frame means 11 will be clamped in fixed position on the guide rods 4.

A second membrane 22 is sandwiched between the face of the membrane plate 18 which is directed toward the moveable plate 10 and a membrane ring 24 abutting against this face and clamping the outer periphery of the membrane 22 against the membrane plate is connected to the membrane ring 24 by screws or the like not shown in the drawing. The membrane 22 forms with the membrane plate 18 another pressure space 23 into which pressure fluid from the aforementioned source may be fed through the bores 20' and 21' in the membrane plate. A pressure plate or piston 28 engages the face of the membrane 22 facing away from the membrane plate 18, and a piston rod 25 having a diameter smaller than the piston 28 integrally formed with the latter, or fixedly connected thereto in any convenient manner, extends with a small clearance through a central bore in the membrane ring 25 toward the movable plate 10 and is connected to the latter in any convenient manner, not shown in the drawing. As clearly shown in FIG. 1, the pressure plate or piston 28 is mounted in the membrane ring 24 with radial and axial clearance. The membrane ring 24 is formed with at least two blind bores the open ends of which face the pressure plate or piston 28 and compression springs 29 located in these blind bores bias the piston 28 in engagement with the outer face of the membrane 22.

The piston rod 25 is formed with a central bore extending from the movable plate into the piston rod and forms a cylinder in which a piston 30 is movable in longitudinal direction. The piston 30 carries an ejector pin 36, aligned with a bore 37 in the movable plate 10, and a corresponding non-illustrated bore in the mold half 9 to eject a molded article therefrom, when the mold halves 9 and 6 are moved to the open position as shown in FIG. 1. It is to be understood that during the molding operation the free end of the ejector pin will be located at the surface defining the cavitiy in the mold half 9 to close the bore in this mold half. The piston 30 and the ejector pin 36 connected thereto may be reciprocated by feeding pressure fluid from the aforementioned non-illustrated source of pressure fluid through the bores 33 and 34 formed in the piston rod 25 into and out from pressure spaces 31 and 32 located to opposite sides of the piston 30.

The above described injection molding machine will operate as follows:

By feeding pressure fluid through the conduit 43 into the pressure space 41 to the right side of the piston 42, the cylinder 39, the guide plate means connected thereto together with the movable plate 10 and the mold half 9 carried thereby will be moved towards the right, as viewed in FIG. 1, to thereby move the split mold 6, 9 to the closed position regardless of the thickness of the split mold. Subsequently thereto, pressure fluid is fed through the bors 20, 21, into the pressure space 19, which will move the clamping cone 13 towards the left, as viewed in FIG. 1, and the clamping jaw 16 in radially outward direction to thereby clamp the guide plate means 11 in fixed position on the rods 4. Molding material is then injected from the injection means 7, which in a known manner is movable in axial direction relative to the stationary plate 2, through the bore 8 in the latter and a corresponding non-illustrated sprue passage in the mold half 6, into the cavity of the split mold. Simultaneously or slightly before injection of molding material under pressure into the closed mold, pressure fluid is fed through the bores 20' and 21' into the pressure space 23 so that this fluid acting through the membrane 22 on the pressure plate or piston 28 will provide the necessary counter pressure holding the slit mold in closed position against the pressure of the material injected under pressure into the mold cavity.

After a molded article is thus formed, pressure is fluid is discharged from the pressure spaces 19 and 23 so that the compression springs 19 and 29 will respectively move the clamping cone 13 and the pressure plate 28 to the rest position as shown in FIG. 1. During such movement of the clamping cone 13 towards the right, as viewed in FIG. 1, the clamping jaws 16 will move radially inwardly out of engagement with the rods 4 and subsequently thereto pressure fluid is fed through the conduit 44 into the pressure space 40 of the cylinder 39 to thereby move the latter towards the left, as viewed in FIG. 1, together with the guide plate means 11 and the movable plate 10 connected thereto so that the mold halves 6 and 9 are moved to the open position as shown in FIG. 1. Subsequently thereto pressure fluid is fed into the pressure space 32 to thereby move the ejection pin 36 towards the right, as viewed in FIG. 1, ejecting the molded article from the mold half 9.

The injection molding machine according to the present invention has a relatively short overall length and its construction is very compact. In addition the disclosed construction permits a quick opening and closing of the split molds.

It will be understood that each of the elements described above, or two or more together, may also find a useful application in other types of injection molding machines differing from the types described above.

While the invention has been illustrated and described as embodied in an injection molding machine having a movable plate carrying half of a split mold and connected to guide plate means provided with hydraulically operated clamping means for clamping the guide plate means and the movable plate connected thereto in fixed position, after the split mold has been closed, on guide rods and in which the guide plate means if further provided with hydraulically operated means for providing a counterpressure holding the split mold in closed position against the force of the molding material injected under pressure into the split mold, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an injection molding machine, a combination comprising a stationary frame including a support plate, a stationary platen spaced from said support plate, and a plurality of axially parallel rods interconnecting said support plate and stationary platen; a movable platen mounted on said rods for axial movement; means for interchangeably mounting parts of a split injection mold having a given axial dimension on said platens for opening and closing said mold; guide means including a guide housing mounted on said rods intermediate said support plate and movable platen for joint movement with the latter, and a membrane plate rigidly connected to said guide housing and having one side facing said support plate and another side facing said movable platen; means for jointly moving said guide means and movable platen to and from a position in which said mold having said dimension is closed; means for arresting said movable platen in said position, including a plurality of clamping jaws mounted on said guide housing for displacement into and out of clamping contact with said rods, a clamping cone mounted on said guide housing at said one side of said membrane for axial displacement and engaging said jaws, a membrane interposed between said one side and said cone and sealingly connected to said membrane plate to define a pressure space therewith, and means for admitting pressurized medium into said space to act on said membrane and deflect the same against said cone to thereby displace the latter and thus said jaws engaged thereby into said clamping contact; means for injecting moldable material under pressure into said closed mold so that said mold parts are urged apart and a separating force acts on said movable platen; and means for counteracting said separating force independently of said arresting means, including a pressure plate rigid with said movable platen and arranged at said other side of said membrane plate, an additional membrane interposed between said other side and said pressure plate and sealingly connected to said membrane plate to define an additional pressure space therewith, and means for admitting pressurized medium into said additional space to exert a force on said additonal membrane and via the same on said pressure plate, which force at least equals said separating force, whereby said arresting means arrests said mold in the closed position thereof and said counteracting means independently maintains said mold in said closed position.

2. A combination as defined in claim 1, wherein said pressure plate is mounted on said guide means with freedom of limited axial displacement relative thereto; and further comprising means for connecting said guide means to said movable platen, including a connecting rod affixed to and extending between said pressure plate and movable plate in axial parallelism with said rods.

3. A combination as defined in claim 2, wherein said guide housing comprises a membrane ring clamping the outer periphery of said additional membrane against said membrane plate, said membrane ring having a portion of larger inner diameter in which said pressure plate is arranged with axial and radial clearance, and a portion of smaller inner diameter through which said connecting rod projects; and including an end plate fixed to said guide housing on the side thereof facing away from said membrane plate.

4. A combination as defined in claim 3; and further comprising at least one spring extending between said membrane ring and said pressure plate and urging the latter toward said membrane plate and away from said membrane ring so that said movable platen and said guide means are moved by said moving means in unison while the force exerted by the pressurized medium on said pressure plate via said additional membrane overcomes the bias of said spring, whereby said pressure plate is free for said limited displacement relative to said guide means.

5. A combination as defined in claim 3, wherein said connecting rod is formed with an axial bore aligned with an opening in said movable platen, an auxiliary piston movably arranged in said bore, passage means in said connecting rod for feeding pressure fluid to opposite sides of said auxiliary piston into and out from said bore, an ejector pin connected to said auxiliary piston and projecting therefrom through the bore and said opening for ejecting a molded article from the mold part carried by said movable platen when the mold is open.

6. A combination as defined in claim 1, said guide housing having portions engaging outer peripheral portions of said rods, said clamping jaws being arranged within said guide frame to respectively engage, during movement of said cone, inner peripheral portions of said rods opposite to those engaged by said guide housing.

7. A combination as defined in claim 1, said moving means comprising fluid operated cylinder and piston means connected to said guide means and said support plate.

8. A combination as defined in claim 7, wherein said cylinder and piston means comprise a cylinder having opposite closed ends and being fixed laterally to said guide plate means and extending parallel to said guide rods, a piston movable in said cylinder and having a piston rod fixed to said support plate, and means for feeding pressure fluid into and out from the interior of said cylinder in the region of said opposite ends.

* * * * *